UNITED STATES PATENT OFFICE 2,139,122

ALIPHATIC AMINOALCOHOLS

Henry B. Hass, West Lafayette, and Byron M. Vanderbilt, Terre Haute, Ind., assignors to Purdue Research Foundation, La Fayette, Ind., a corporation of Indiana No Drawing. Application August 13, 1937,
Serial No. 158,956

3 Claims. (Cl. 260—584)

Our invention relates to new and useful aliphatic aminoalcohols and, more particularly, to aminoalcohols wherein the carbon atom attached to the amino group is adjacent to the carbon atom attached to the hydroxyl group.

The aminoalcohols of our invention have been found to be of particular value for use as corrosion inhibiting agents in anti-freeze solutions. These compounds are organic bases containing free amino and hydroxyl groups and various other uses for them will readily occur to persons skilled in the art.

Specifically, the aminoalcohols of our invention have the following general structural formula:

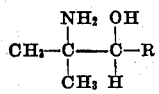

wherein R consists of a member of the group consisting of H and CH₃. The two aminoalcohols included in this formula are 2-amino-2-methyl-1-propanol and 3-amino-3-methyl-2-butanol.

These aminoalcohols may be suitably prepared by any of the known methods of reducing a nitro to an amino group provided that the conditions are not sufficiently drastic to cause splitting of the molecule. We prefer, however, to prepare these compounds by the catalytic hydrogenation of the corresponding nitro compounds in accordance with the process of our copending application Serial No. 151,841, filed July 3, 1937. According to this process the nitroalcohol is hydrogenated at atmospheric or increased pressures in the presence of a nickel catalyst in the liquid phase with or without an auxiliary solvent at temperatures under 125° C. In general, any hydrogenation catalyst may be used that is active in the temperatures employed. We prefer, however, to use a powdered nickel catalyst as prepared in the following manner: A nickel-aluminum alloy is prepared in the powdered form, a suitable alloy containing 50% aluminum and 50% nickel. The aluminum is dissolved out of the powdered alloy by strong alkali solution, and the nickel residue is washed free from alkali and salts with water and kept under liquid. This catalyst is active at temperatures around 25° C. and may be used repeatedly without losing its activity. The hydrogenation may be carried out at hydrogen pressures varying from atmospheric pressure to over 2,000 pounds per square inch. The rate of reaction is directly proportional to the hydrogen pressures and the temperatures employed. Thus, at a hydrogen pressure of 600 pounds per square inch and at temperatures from 60 to 70° C. under the conditions we have employed, the hydrogenation will, in general, be found to be complete after a period of 15 to 45 minutes. Lower pressures and lower temperatures will, in general, require longer times for the hydrogenation reaction to be completed and, conversely, higher pressures and temperatures will, in general, shorten the time for completion of the hydrogenation reaction. Optimum pressures and temperatures may be readily determined by simple experimentation and will depend, to some extent, on the amount of catalyst and solvent employed, the surface of the reaction mixture exposed to the hydrogen, the rate of agitation, and the tendency for the nitroalcohol to decompose at higher temperatures under the conditions employed. Methyl or ethyl alcohol may be employed as solvents. The hydrogenation may, if desired, be carried out in the presence of carbon dioxide, as disclosed in our copending application Serial No. 158,960 filed August 13, 1937. The carbon dioxide combines with the bases formed during hydrogenation to form carbonic acid salts, and thus substantially reduces the tendency of the nitroalcohols to decompose during the reaction since the nitroalcohols are somewhat unstable in basic solutions.

After the reaction has been effected the catalyst may be separated from the reaction mixture by any suitable means such as filtration or decantation and the aminoalcohol separated from the solution by fractional distillation. The aminoalcohol may be further purified by refractionation at atmospheric or reduced pressures, by fractional crystallization of certain of its salts such as the carbonates, oxalates, or hydrochlorides, or, in the case of the solid aminoalcohols, by fractional crystallization of the pure compound from suitable solvents.

The following examples illustrate suitable procedures for the preparation of the aminoalcohols of this group:

Example I

Fifty-five and four tenths parts by weight of 3-nitro-3-methyl-2-butanol were mixed with 144 parts of methyl alcohol, 20 parts of water, and 7½ parts of nickel catalyst, prepared as described in the foregoing, and the mixture was introduced into a suitable pressure hydrogenation apparatus and sealed. Hydrogen was then introduced into the apparatus at 600 pounds per square inch at such a rate that the temperature of the reaction did not rise above 45° C. When little or no heat was being evolved from the reaction, the hydrogen pressure was increased to 1,000 pounds per square inch and maintained at such for an additional 2½ hours with constant agitation. At the conclusion of the hydrogenation the reaction mixture was removed from the hydrogenation apparatus and the catalyst separated from the solution by filtration. The solution was subjected to fractional distillation and 3-amino-3-methyl-2-butanol was obtained.

*Example II*

One hundred four and five-tenths parts by weight of 2-nitro-2-methyl-1-propanol, 320 parts of methanol, 60 parts of solid carbon dioxide, and 2½ parts of nickel catalyst were introduced into a suitable hydrogenation apparatus and sealed. Hydrogen was introduced into the apparatus such that the total pressure of carbon dioxide and hydrogen within the apparatus was maintained at a pressure of about 600 pounds per square inch. The reaction was allowed to continue for 3¼ hours at room temperature with constant agitation. At the conclusion of the reaction the catalyst was separated from the solution by filtration. The solution was subjected to fractional distillation and the nitroalcohol was recovered as 2-amino-2-methyl-1-propanol. The carbonic acid salts were decomposed to carbon dioxide and free base during the heating.

3-amino-3-methyl-2-butanol is a viscous colorless liquid at room temperature, and 2-amino-2-methyl-1-propanol is a white crystalline solid which melts at 25.5° C. They are both extremely stable at temperatures up to at least 200° C. and are soluble in the ordinary oxygenated organic solvents such as ethyl alcohol, acetone, and ethyl acetate. The following physical properties were determined for these aminoalcohols which were prepared as indicated in the above examples:

|  | Boiling point °C. 760 mm. (corrected) | Refractive index | Specific gravity |
|---|---|---|---|
| 2-amino-2-methyl-1-propanol | 165.5 | 1.4450 (30° C.) | 0.9281 (30/4) |
| 3-amino-3-methyl-2-butanol | 159.5 | 1.4492 (20° C.) | 0.9196 (25/4) |

Since the number of preparations of each compound examined was limited, it should be understood that while the properties given will be useful in identifying the compounds of our invention, we do not wish to limit ourselves to products having the exact properties listed.

The 2-nitro-2-methyl-1-propanol and the 3-nitro-3-methyl-2-butanol used in preparing the 2-amino-2-methyl-1-propanol and the 3-amino-3-methyl-2-butanol described above may be prepared by any suitable method for introducing the nitro group into an aliphatic compound. However, we prefer to prepare these compounds in accordance with the process of copending application Ser. No. 146,855 of Byron M. Vanderbilt, filed June 7, 1937. According to this process, a primary or secondary nitroparaffin and an aliphatic aldehyde are reacted in the presence of an auxiliary solvent, such as ethyl alcohol, and in the presence of an alkaline catalyst such as sodium hydroxide, the aldehyde being slowly added to a solution of the nitroparaffin and catalyst in the auxiliary solvent while thoroughly agitating.

The aminoalcohols of our invention are particularly useful as corrosion inhibitors in antifreeze solutions used in the cooling systems of internal combustion motors. For example, either of the aminoalcohols of our invention may be added to a water or water-alcohol solution in concentrations of from 0.1 to 1.0% and thereby substantially inhibit corrosion of the metal by the solution. Due to the basic nature of these compounds they may also be utilized to absorb acids such as hydrogen sulfide or carbon dioxide from industrial gases. The aminoalcohols of our invention are also useful as intermediates for the preparation of numerous organic compounds and various other uses of these materials will be apparent to those skilled in the art.

Our invention now having been described, what we claim is:

1. An aminoalcohol of the formula:

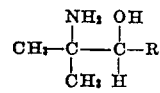

wherein R consists of a member of the group consisting of H and CH$_3$.

2. 2-amino-2-methyl-1-propanol.
3. 3-amino-3-methyl-2-butanol.

HENRY B. HASS.
BYRON M. VANDERBILT.